UNITED STATES PATENT OFFICE.

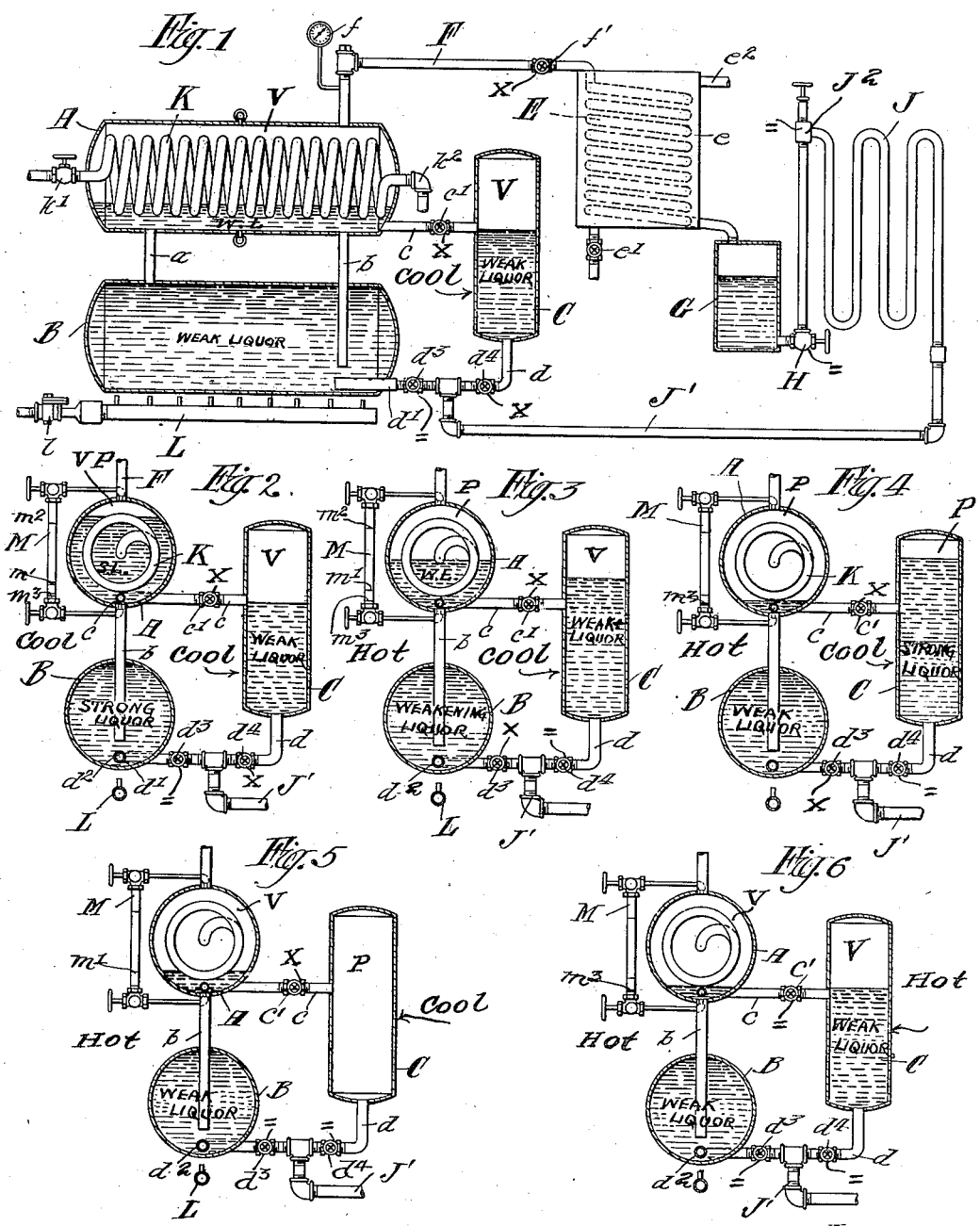

WILLIAM J. KELLY, OF CHICAGO, ILLINOIS, ASSIGNOR TO AUTOVACUUM REFRIGERATING COMPANY, OF NEW ORLEANS, LOUISIANA, A CORPORATION OF LOUISIANA.

PROCESS OF REFRIGERATION.

1,122,602.  Specification of Letters Patent.  Patented Dec. 29, 1914.

Continuation of application filed May 26, 1913, Serial No. 770,003. This application filed March 5, 1914. Serial No. 822,631.

*To all whom it may concern:*

Be it known that I, WILLIAM J. KELLY, a citizen of the United States, and a resident of Chicago, Cook county, Illinois, have invented a certain new, useful, and Improved Process of Refrigeration, of which the following is a specification.

My invention relates to the art of refrigeration by ammonia expansion; and has special reference to improvements in and upon those processes in which ammonia is distilled from aqua ammonia, then condensed or liquefied under pressure, then allowed to expand and thus perform its refrigerating function, and finally, re-absorbed by the liquor from which it was distilled; an example of which is disclosed in the Smith process Patent No. 1,038,220, granted September 10, 1912.

In such processes as commonly practised, refrigeration is intermittent because re-absorption and distillation cannot proceed simultaneously in a single vessel or container. A suspension of refrigeration may be avoided by the alternate use of two containers, but the double cost of apparatus and aqua ammonia is disproportionate to the benefits secured. Further, such processes are limited to the use of anhydrous or substantially anhydrous liquid ammonia. Even four or five per cent. of water in the liquid ammonia makes them inefficient, unreliable and costly, and to exclude water it is necessary to de-hydrate the gas before condensing it, or to rely upon a slow and incomplete distillation at temperatures too low to generate steam, as in the case of the Smith process. Slow distillation means long interruption of refrigeration, and when distillation is incomplete, very little liquid distillate is secured and frequent distillations are required with as many interruptions of refrigeration.

A primary object of my invention is to accomplish continuous ammonia absorption refrigeration without materially, if at all, increasing the quantity of aqua ammonia and without resorting to a duplication of apparatus.

Another primary object of my invention is to make a liquid ammoniacal refrigerating agent containing ten, twenty and even higher percentages of water, and enable its use with refrigerative results as good as or better than generally obtained with liquid anhydrous ammonia.

Still further objects of the invention are to secure a maximum of liquid refrigerating agent at each distillation of a given quantity of aqua ammonia, and to make distillation less frequent, even though no longer involving the suspension of refrigeration.

Starting with a body of strong aqua ammonia in a suitable container, I reduce it to a weak state by distillation, and liquefy the distillate, for use in a refrigerating coil or element in the usual manner. I then withdraw a small quantity or portion of the weak liquor from the container and hold it in reserve in an auxiliary tank. At that time I connect the return pipe of the refrigerating coil with the container, so that re-absorption may proceed therein. The liquor in the container ultimately again reaches a strong state through absorbing the returning ammonia and I then divert the returning flow or expansate away from the container and into the reserved weak liquor in the auxiliary tank. While the flow or expansate from the coil is being cared for in this way, I again distil the contents of the container and liquefy the distillate as before. When this re-distillation is finished I disconnect the return or expansate pipe from the auxiliary tank and again join it to the container. At that time also, I exchange the then strong liquor in the auxiliary tank for a fresh reserve of weak liquor from the container, so that the described operations may be repeated. And thus I bridge the usual gap between distillation and re-absorption in the container, and uninterruptedly conduct refrigeration in the coil. As explained hereinafter, I preferably accomplish the exchange of liquor automatically without using a pump or the like for that purpose. The return flow of expansate being substantially constant, it is obvious that the volume of liquor held in reserve must be proportioned to the time the container is out of use as an absorber. In other words, its size depends upon the time consumed in distilling the main body and preparing it to again receive the flow from the coil. If the distillation period is long the reserve must be correspondingly large. The reserve body is weak when first withdrawn from the container but it is strong at the time it is exchanged. The mixing of a large body of strong liquor with the weak liquor in the container would increase the strength of both the latter and the next body of reserve liquor and by thus reducing their absorptive capacity would, in the sum of efficiency, practically negative the benefits of continuity. Therefore my invention includes further steps by which I reduce to a minimum the period during which the flow from the coil is excluded from the container, and am thus enabled to carry on refrigeration continuously by the aid of a reserve body so small that its return to the main body does not materially diminish the absorptive capacity thereof. The steps here referred to consist in rapidly forcing the temperature in the container to a point where substantially complete distillation is accomplished in a minimum of time, and immediately thereafter creating a vacuum in the container. As hereinafter explained I prefer to create this vacuum by operations within the container rather than by a vacuum pump or the like. The vacuum marks the end of the distillation period for immediately thereafter and while the weak liquor is still hot, though somewhat below steaming temperature. I turn the expansate into the container, and also recharge the auxiliary tank with liquor. All this I accomplish in about one fourth the time which usually elapses between the moment of applying heat to the container and the resumption of absorption therein, and thus I make it possible to successfully bridge this gap with a very small reserve or auxiliary body of weak liquor.

Though the elemental steps of my process admit of the making and use of anhydrous ammonia I preferably make no effort to exclude water from the liquid distillate for to do so would increase the cost and lessen the quantity and the rate of distillation, but on the contrary I rapidly force distillation until a considerable quantity of water is driven off along with practically all the ammonia in the liquor. Thus I avoid the usually observed limitations upon distillation and secure a maximum of distillate in a minimum of time, the distillate being a liquid solution comprising a major part of ammonia and a minor part of water. I think there should always be at least five per cent. of water in the solution, but beyond that the proportions may be varied within considerable limits, and thus far I have secured the best results with ammoniacal liquids containing from twenty to twenty-five per cent. of water.

I call the hydrous liquid here described "wet ammonia" to distinguish it from the "dry" or anhydrous liquids in general use. When expanded from a pressure which equals or exceeds the inherent pressure of its liquid ammonia content, this "wet" ammonia has a refrigerating effect exceeding that of an equal measure of "dry" ammonia. As explained hereinafter the most successful use of this wet resultant of the speedy distillation best suited to the success of the gap-bridging reserve is in turn dependent upon the creation and maintenance of the above described vacuum upon the weak liquor.

My invention will be more readily understood by reference to the accompanying drawings forming a part of this specification and in which I have illustrated an apparatus that I prefer to use in carrying out my invention.

In said drawings, Figure 1 is a diagrammatic sectional view of the apparatus. Figs. 2, 3, 4, 5 and 6 are similar diagrammatic explanatory views, with the container in transverse section, setting forth several steps of my process.

As shown in Fig. 1 the main container, which serves alternately as an absorber and a still, comprises two closed tanks or compartments A and B, occupying horizontal positions one above the other and connected by restricted and, preferably, siphonic passages or pipes $a$ and $b$. $a$, is the up flow passage and $b$, is the down flow passage. K is a cooling coil arranged in the upper compartment, and $k'$ is its regulating valve and $k^2$ the outlet. $d'$ is a pipe through which the return flow or expansate from the refrigerating coil J enters the lower compartment. As shown the pipe opens into the container beneath the lower end of the down flow or fall duct $b$. L represents a fuel burner (of which $l'$ is the regulating valve) used for heating the contents of the container. In lieu of a fuel burner I sometimes employ a steam coil (not shown) in the lower compartment. And to avoid loss of heat I sometimes inclose the container in a casing or hood (not shown), open to the air at the top and bottom. As shown a pipe F, provided with a pressure and vacuum gage $f$, leads from the top of the container and serves to deliver the distillate to the condenser E, the coil whereof is shown in dotted lines. $f'$ is a shut off or back check valve in the pipe F. $e'$ and $e^2$ are the water supply and overflow pipes of the condenser. The condenser coil leads to the reservoir G, which has an outlet valve H. To this valve is connected the refrigerating element or coil J. $J^2$ is the expansion valve of the refrigerating coil. The expansate or return pipe $J'$ of the coil joins the pipe $d'$ in the container A—B, a valve $d^3$ being interposed. C is an auxiliary tank serving the purpose above explained. The bottom of the tank C is connected with the container and with the return pipe $J'$ by a pipe $d$, containing a valve $d^4$. The upper part of the tank C is connected with the upper compartment of the container by a pipe $c$, containing a valve $c'$. M is a sight gage glass upon the upper part of the container; and $m'$, $m^2$, $m^3$ are indicating marks on the gage glass, which facilitate use of the apparatus.

The mark P as applied in the drawings indicates pressure; the mark V indicates a partial vacuum; the mark = indicates an open valve; and, the mark $x$ indicates a closed valve.

The diagrammatic drawings depict the several conditions, and the action, of the liquor in the connected tanks. Thus Fig. 1 depicts the condition during the early part of the absorption period; Fig. 2 shows the condition near the end of the absorption period; Fig. 3 the condition midway of the distillation period; Fig. 4 the condition near the end of the distillation period, just before the creation of a vacuum in the container; Fig. 5 the condition after the vacuum is created and when the strong liquor from the auxiliary tank C has been discharged into the container; and, Fig. 6 the condition after the refilling of the auxiliary tank, when absorption is beginning in the main container, but before the valves $c'$ and $d^4$ have been closed.

In initially preparing this improved apparatus for use I preferably fill the container with aqua ammonia of about 30 Baumé and preferably exhaust the air from the system. In some cases I also partially fill the auxiliary tank C with clear water and put a small charge of anhydrous ammonia in the reservoir G, so that refrigeration may be initiated while the first distillation is going forward in the main container. The process may also be started by charging both the container and the auxiliary tank with clear water and the reservoir with anhydrous ammonia and proceeding with absorption in the container immediately after driving or exhausting the air from the system. After starting in this last way the process may be conducted in the manner above outlined and hereinafter more fully explained. As stated, I prefer to begin with 30 Baumé aqua ammonia, if need be, enriching aqua ammonia with anhydrous ammonia, to secure that degree of saturation. I usually continue distillation until the liquor retains not more than five per cent. of ammonia. Reabsorption of ammonia usually restores the liquor to 30 Baumé condition. These fluctuations, from strong to weak and from weak to strong, are repeated in each cycle of operations. Weak liquor swells or increases in volume from the addition of expansate, whereas the driving off of ammonia gas and water vapor from a quantity of strong liquor reduces its volume. Hence, the volume of the liquor in the container varies at different stages of the operation. This is also true of the liquor in the auxiliary tank. Thus Fig. 2 shows the relative volumes at the time that re-absorption ceases in the container; Fig. 4 the relative volumes at the end of the distillation period before the exchange is made; and Fig. 6 the condition after the exchange. Intermediate stages are depicted in Figs. 3 and 5.

As depicted in Fig. 1, the container holds weak liquor and is receving expansate from the coil J. The valves $f'$, $c'$, $d^4$ are closed. The valves $d^3$, H and $J^2$ are open. The valves $k'$ and $l'$ are closed because neither cold nor heat are required in the container during the absorption stage. There is a nearly complete vacuum in the top of the container, the vacuum having been obtained, preferably, in the manner hereinafter described. Throughout this stage the auxiliary tank C contains a quantity of weak liquor and a vacuum, previously derived from the main container. Absorption continues under these conditions until the liquor in the container is restored to a state of saturation and has increased to a volume which nearly fills the container. The vacuum in the container is sometimes but not always completely destroyed when this stage is reached. The conditions at the end of the absorption period are well depicted in Fig. 2. When the liquor in the main container is substantially saturated a continued flow of expansate would only build up a back pressure in in the container and reduce the efficiency of the system. At that time, therefore, I close the valve $d^3$ and open the valve $d^4$, thus cutting off the container and diverting the expansate into the auxiliary tank C. Then I make a fire beneath the container, or heat its contents by the steam coil, before mentioned. Ammonia gas begins to evolve or distil from the strong liquor at a very low temperature; about 60 degrees Fahr. in the case of 30 Baumé aqua ammonia; and a pressure is quickly built up in the container. When the pressure exceeds ninety pounds I open the valve $f'$ and permit the gas to flow into the condenser E, in which meantime the flow of cooling water has been started. Under such pressure the gas liquefies in the condenser. The liquefied ammonia is collected in the reservoir G. When the standing pressure in the reservoir is high, the opening of the valve $f'$ is delayed until the pressure in the container equals that in the reservoir. As ammonia leaves the liquid in the container, higher temperatures are required to drive off the remainder; and obviously these higher temperatures are automatically obtained by continuing the fire under the container. I employ heat ample to raise the temperature rapidly, and expedite ammonia distillation without regard to temperatures that will generate steam from the water. The only limitations upon the heating of the container are those of economy, to prevent waste of heat, and the capacity of a condenser, proportioned to prevent an excessive accumulation of pressure in the container.

It is to be understood that a pressure of 90 to 250 pounds may exist in the container during the several stages of distillation; and that most of the ammonia is driven off before the liquor is hot enough to generate steam, at the pressure attained. But even after that temperature is reached I continue the heat for the purpose of driving off all but a small residue of ammonia and at the same time driving off a quantity of steam or water vapor. The gas and the vapor both pass to the condenser and are there liquefied. In this manner I almost wholly rid the liquor of ammonia and thus put it in the best possible condition to absorb ammonia. In doing so, I take from the contents of the container and store in the reservoir G under the pressure of condensation, substantially the maximum of ammonia that may be obtained from the given quantity of 30 Baumé aqua ammonia; the liquid condensate containing upward of twenty per cent. of water. Having done this I extinguish the fire beneath the container and close the distillate valve $f'$. It will be remembered that at this time the coil J is still discharging into the tank C and not into the container.

As soon as the heat is cut off and the valve $f'$ closed, and while the weak liquor in the container is still hot, I create a nearly complete vacuum in the container. For this purpose I employ the contents of the container in conjunction with a flow of cold water in the cooling coil K. At that moment very little liquid remains in the upper compartment, but it is filled with hot distillate, of which, if my observation be correct, water is the chief constituent. And it follows that, as it is chilled by the cooling coil, condensation ensues and the pressure in the container is rapidly reduced. In practice the drop of pressure from, say, two hundred pounds to atmospheric pressure is accomplished in approximately five minutes; i. e. condensation continues until the hot liquor ceases to give off steam under the reduced temperature. The sudden drop of temperature liquefies much of the ammonia gas and all of the water vapor. The removal of the gas is doubtless also aided by the absorption thereof by the cooled water of condensation. That is, much of the ammonia is thrown down with the water. It appears, however, that not all of the gas is removed in this way, for after the pressure drops to about zero there follows a violent surging of the liquor through the circulation pipes, $a$ and $b$, and the liquor repeatedly dashes through, and rises nearly to the top of, the upper compartment. The surging is undoubtedly due to the sudden relief of pressure in the upper compartment and the momentarily higher pressure and density of the liquor in the lower compartment which cause the liquor to surge through the restricted passage or passages between the compartments. The surging of the liquor diminishingly continues five to ten minutes, at the end of which time the liquor resumes a substantially quiet state; and it is found that approximately a thirty inch vacuum has been created in the upper compartment. The exhausting of the residue of ammonia gas from the upper compartment is doubtless due to the described agitation of the weak liquor in the upper compartment, it being clear that under such circumstances the weak liquor quickly absorbs and retains the ammonia gas. It might be expected that the weak liquor when relieved of pressure in this manner would give up its ammonia and destroy the void instead of taking on more ammonia, but this is not the case for the quantity of ammonia in the weak liquor is very small, and though the liquor is at that time hot, its tension or affinity for ammonia is greater than that of the void in the top of the container. Therefore, when once the vacuum is established and the liquor conditioned as above described, I stop the flow of water in the cooling coil K, and, opening the valve $d^3$, allow expansate to again enter the container; all within ten to twenty minutes after the heat is shut off and hours before the liquor would cool to the point usually regarded as essential to effective absorption of ammonia. Immediately upon resuming absorption in the container I exchange the then strong liquor in the tank C for a fresh reserve of the weak liquor from the container. Instead of using a pump for this purpose I preferably take advantage of conditions existing in the two containers at the moment. The addition of expansate to the auxiliary body of liquid during the distillation period is sufficient to considerably increase its volume as well as its strength. This condition is indicated in Fig. 4. The increase of volume reduces or destroys the vacuum and sometimes ultimates in a back pressure in the auxiliary tank. Therefore after the vacuum is formed in the container a marked difference in pressure exists between the auxiliary tank and the container and when the valve $d^3$ is opened to admit expansate to the latter, and the valve $d^4$ being still open, the contents of the tank C is forcibly discharged into the container through the pipe $d'$. This liquor is relatively cool and serves to somewhat reduce the temperature of the main body of liquor in the container, and being of relatively small volume the addition of ammonia from the auxiliary tank does not materially increase the strength of the larger body. The emptying of the auxiliary tank and the momentary addition to the volume of liquid in the container may be clearly understood on comparison of Figs. 4 and 5. Upon the emptying of the auxiliary tank I open the valve $c'$ in the pipe $c$ whereupon pressure conditions are equalized in the connected tanks and weak liquor from the container flows into the auxiliary tank, corresponding levels being established. I then close the valves $c'$ and $d^4$ and thus shut off the auxiliary tank from both the container and the refrigerating coil. Obviously the auxiliary tank is thus filled with hot weak liquor under a vacuum and by the cooling of the liquor while waiting to be used, the vacuum in the tank is somewhat increased.

My purpose in placing the equalizing pipe $c$ below the top of the tank C, is to prevent the complete filling of the auxiliary tank at the moment of equalization and to thus leave room for liquid expansion, as indicated in Figs. 2 and 4. The auxiliary tank may best occupy a vertical position near the upper part of the container, but if care be used in operation it may be placed below the container, suitable arrangement being always made to discharge the liquor from its bottom. The interchange may be performed in various ways and good results may even be secured when the equalizing pipe $c$ is dispensed with or is connected with the lower part of the container.

The absorption of expansate in the container proceeds from the moment that the valve $d^3$ is opened until, after many hours in the case of apparatus of usual dimensions, the condition depicted in Fig. 2 is again attained and it again becomes necessary to distil the then strong liquor, whereupon the valve $d^3$ is closed and the valve $d^4$ opened to again divert the expansate into the auxiliary tank and enable refrigeration to proceed uninterruptedly while a new distillation goes on in the container.

To avoid uncertainty in operation I calibrate the gage glass M, placing the marks $m'$, $m^2$ and $m^3$ at levels assumed by the liquid on termination of respective operations. Thus the mark $m^2$ indicates the end of the absorption period and the substantial destruction of the vacuum in the container. The mark $m^3$, when the liquid drops to that level, indicates the completion of distillation, i.e. the making of a full measure of condensate containing the proper proportions of ammonia and water. And the mark $m'$ indicates the emptying of the auxiliary tank. The fall of the liquid therefrom to the mark $m^3$ shows that the auxiliary tank has refilled, and that the valves $c'$ and $d^4$ may be closed.

Reverting to the cooling operation by which the vacuum is secured in the container, it is obvious that the weak liquor, if any, in the bottom of the upper compartment will be somewhat reduced in temperature by the cooling coil but that, following the described surging of the liquid in the container and the shutting off of the water from the coil, the temperatures are substantially the same in the two compartments of the container; however, a slight circulation continues through the siphonic ducts. And this circulation is resumed or augmented whenever the lower is hotter than the upper compartment; as from the more rapid radiation of heat from the upper or an increment of heat in the lower compartment. The circulatory exchange of cooler for warmer liquor tends to keep that in the lower compartment in highly absorptive condition.

Referring to Fig. 1 it will be seen that the down pipe $b$ delivers the cooler liquid from the upper compartment upon the stream of expansate entering through the pipe $d'$ and that to escape from the compartment A the expansate bubbles are compelled to move through the whole length of the compartment before reaching the up flow pipe $a$, this insures complete absorption.

When the described solution under pressure is permitted to escape from the reservoir G through an expansion valve $J^2$, it immediately vaporizes and expands within the refrigerating coil J. The constituent water of this solution, unlike liquid ammonia, would not expand at atmospheric pressure or against back pressure, but nevertheless the solution does expand effectively under the combined effect of its inherent pressure and the vacuum in either the container or the auxiliary. If my observation be correct, the solution expands as one body or substance and the initial expansate is a vapor of said solution. Proportionally, the expansion or evaporation of the constituent water is of greater effect than that of the constituent ammonia, and this enforced evaporation of the water under vacuum conditions, results in a proportionately greater absorption of heat. Thus I add materially to the heat absorption and in all cases I secure as much or more refrigeration, pound for pound, from this wet ammonia than from anhydrous or dry ammonia.

Weak liquor under vacuum in either the container or the auxiliary tank has a great affinity for ammonia and in a similar sense an affinity for water vapor. Therefore the weak liquor takes up the expansate as rapidly as it enters from the refrigerating coil. Primarily the weak liquor, through the effect of contact, condenses and takes up the water vapor, and simultaneously absorbs the constituent ammonia, and thus both constituents of the expansate return together and are absorbed by the weak liquor, whether the same is hot or cold and whether or not there occurs a preliminary separation of the ammonia gas and water before the expansate reaches the weak liquor. Water under a vacuum is an unstable liquid and when once vaporized tends to retain its vaporous state; and any water which is condensed by the impact of the vapor upon the walls of the refrigerating coil is at once atomized or revaporized by the high velocity gases, which under a vacuum, move through the coil at great speed. From these facts it follows that very little of the water vapor separates or is condensed until it enters the weak liquor in the container.

My process involves an unusual and unexpected result in that both expanded anhydrous ammonia and the herein described aqueous expansate are readily absorbed by weak liquor at a temperature little below that at which it would steam. As before stated, I do not wait for the weak liquor to cool after distillation but turn the expansate into the container at once. In addition to the facts previously mentioned I find special explanation of the absorption of the aqueous expansate by hot liquor, in the fact that the constituent water vapor is of relatively larger volume than the constituent ammonia gas, and on entering into contact with the liquor is at once condensed and accelerates and insures absorption of the accompanying ammonia. And by the time saturation has proceeded to the point where the liquor would not take up ammonia at so high a temperature, radiation produces a temperature low enough to retain the absorptive capacity of the liquor. Obviously, the liquor (at any non-steaming temperature) will always absorb water.

I apprehend that the great success and high efficiency of my process lies largely in the presence of so great a quantity of water vapor in the expansate that its condensation by the weak liquor stimulates, and maintains the effect of, a vacuum in the return pipe of the system. This joined to the effect of the vacuum above the liquor results in the maintenance of a vacuum condition that insures the effective expansion of both constituents of the wet ammonia in the coil.

After the reservoir is first charged the expansion valves H and $J^2$ are opened and thereafter remain open constantly or as long as refrigeration is required. This being understood the mechanical acts performed upon the described apparatus may be summarized as follows:—When the liquor shows at the mark $m^2$ of the gage glass, the valve $d^3$ is closed and the valve $d^4$ is opened, discontinuing absorption in the container and initiating it in the auxiliary tank. Then the burner is lighted, to heat the container.
The water valve $e'$ is then opened, to cool the condenser. The valve $f'$, if automatic, opens when the pressure in the container balances that in the reservoir G; if not automatic the valve $f'$ is manually opened at a point indicated by the gage $f$. When the liquor shows at the mark $m^3$ the fire is extinguished and the valve $f'$ closed. Then the water is turned into the coil K, by opening the valve $k'$. When the liquor rises in the gage glass and finally subsides, the water valve is closed, and immediately the valve $d^3$ is opened, to resume absorption in the container and permit the tank C to empty thereinto. This action is indicated by a rise of liquor to the mark $m'$ on the gage glass and thereupon the valve $c'$ is opened, to permit the tank C to refill. The refilling of the tank results in again lowering the liquor to the gage mark $m^3$ and thereupon the valves $d^4$ and $c'$ are closed, and absorption proceeds in the container until the liquor again rises to the gage mark $m^2$.

A marked advantage of a refrigerating system operated in accordance with my process is that the aqua ammonia may be distilled as often as desired without interrupting refrigeration in the coil and therefore a container of very moderate size serves every purpose where the operator is present or where automatic means are provided to control the heat and operate the several valves.

Where the container is heated at frequent intervals I prefer to prolong the use of the cooling coil K or to use means for cooling the liquor in the lower compartment immediately after the described surging operation, the purpose of this step being to extract enough heat to insure a sufficiently low temperature at the time when the liquor is saturated by a relatively quicker return of the ammonia. Absorption may be prolonged in the auxiliary tank C by using a cooling coil therein, but I find this necessary only in small installations that are called upon to supply disproportionately large refrigerating coils and in which distillation is frequent.

It will now be clear that all of the objects set forth in the opening of this specification are attained in my process; chiefly, by the use and interchange of the auxiliary bodies of weak liquor; by the making and using of wet ammonia; by speeding distillation and almost instantly thereafter creating a vacuum over the hot liquor; and by resuming absorption in the container at once, without waiting for the weak liquor to cool. The manner in which I create the vacuum and the manner in which the auxiliary interchange is accomplished are also distinct aids to the attainment of these objects.

The results of my invention are, continuous refrigeration; more refrigeration from a given quantity of liquor; a greater quantity of distillate from each operation; fewer distillations; simplified and briefer operations; the avoidance of the common objections to water in the refrigerating coil; the elimination of the losses commonly associated with the dehydration of ammonia; the avoidance of power actuated pumps and kindred mechanisms; and, the avoidance of the need for duplicate apparatus.

One incident of my invention is that several of its novel steps and features may be used in curtailments of my process and also, independently, in connection with older processes. I do not limit my invention to the performance in any one cycle of all of the steps herein set forth; nor to the precise steps, or sequence of steps, described; it being apparent that various modifications, changes and substitutions will suggest themselves to one skilled in the art and may be made without departing from the spirit and scope of my invention as set forth in the appended claims.

This application is a continuation of an application, Serial No. 770,003, which I filed May 26, 1913 and now abandon in favor of this application.

The herein described apparatus is not claimed in this application but is both described and claimed in a companion application of even date herewith

Having thus described my invention I claim as new and desire to secure by Letters Patent:

1. The improvement in the art of ammonia absorption refrigeration that consists in absorbing the expansate in a small body of weak liquor while the large body of strong liquor is being distilled and thereafter interchanging said small body with another from the large body of then weak liquor, and holding the new small body in reserve while the large body is absorbing expansate.

2. The improvement in the art of ammonia absorption refrigeration that consists in absorbing the expansate in a small body of weak liquor held under a partial vacuum while the large body of strong liquor is being distilled and thereafter interchanging said small body of then strong liquor under increased pressure, with and for another small body from the large body of then weak liquor, and holding the new small body in reserve under a partial vacuum while the large body is absorbing expansate.

3. The improvement in the art of ammonia absorption refrigeration that consists in absorbing the expansate in a small body of weak liquor while the large body of strong liquor is being distilled, placing the large body of resultant weak liquor under a partial vacuum after distillation, then interchanging the small body of then strong liquor with another from the large body of then weak liquor, and holding the new small body in reserve while the large body under vacuum is absorbing expansate.

4. The improvement in the art of ammonia absorption refrigeration that consists in absorbing the expansate in a small body of weak liquor held under a partial vacuum while the large body of strong liquor is being distilled, placing the large body of resultant weak liquor under a partial vacuum immediately after distillation, then interchanging the small body of then strong liquor with another from the large body of weak liquor, holding the new small body under a partial vacuum in reserve against the next distillation, and proceeding with expansate absorption in the large body of weak liquor under vacuum.

5. The improvement in the art of ammonia absorption refrigeration that consists in reserving a portion of weak liquor in a closed tank until the end of expansate absorption in the container, then diverting the expansate into the liquor in said tank and continuing absorption therein until the end of distillation in said container, then permitting the liquor to discharge from said tank into said container by its own relative pressure and then permitting an equalization of pressures in the tank and container and thereby recharging the tank with weak liquor.

6. The improvement in the art of ammonia absorption refrigeration that consists in reserving a portion of weak liquor in a closed tank until the end of expansate absorption in the container, then diverting the expansate into the liquor in said tank and continuing absorption therein until the end of distillation in said container, permitting the liquor in said tank to discharge into said container and then recharging the tank with weak liquor from the container.

7. The improvement in the art of ammonia absorption refrigeration that consists in withdrawing from the container a portion of weak liquor, holding the same in reserve until the end of expansate absorption in the container, then diverting the expansate into the reserved weak liquor, and after distillation exchanging the then strong, reserved liquor for another reserve of weak liquor from the container.

8. The improvement in the art of refrigeration that consists in withdrawing a minor quantity of weak liquor from the container of an ammonia absorption refrigerating system and holding such minor body in reserve while the flow from the refrigerating element is being absorbed in the container, thereafter proceeding with distillation in the container and meantime diverting said flow into said minor or reserve body, returning said minor body to the container at the end of distillation therein and thereafter withdrawing another reserve of weak liquor from the container and readmitting said flow to the container.

9. The improvement in the art of refrigeration that consists in distilling the contents of the container of an ammonia absorption refrigerating system and meantime diverting the flow from the refrigerating element into a closed tank containing a body of absorptive liquor smaller than that in the container, and then after the creation of a partial vacuum in said container, discharging the smaller body by its own relative pressure into the container and then equalizing pressures and liquid levels in the container and the tank and thus storing said tank with liquor from the container, as a reserve against the next interruption of absorption in the container.

10. The improvement in the art of refrigeration that consists in withdrawing a minor quantity of weak liquor from the container of an ammonia absorption refrigerating system and holding such minor body in reserve while the flow from the refrigerating element is being absorbed in the container, thereafter proceeding with distillation in the container and meantime diverting said flow into said minor or reserve body and increasing the relative pressure thereof, returning said minor body by its own pressure to the container at the end of distillation therein and thereafter withdrawing another reserve of weak liquor from the container and again proceeding with absorption in the container.

11. The improvement in the art of refrigeration that consists in withdrawing a minor quantity of weak liquor from the container of an ammonia absorption refrigerating system after the creation of a substantial vacuum therein and holding such minor body in reserve under a partial vacuum while the flow from the refrigerating element is being absorbed in the container, thereafter proceeding with distillation in the container and meantime diverting said flow into said minor or reserve body, creating a substantial vacuum in the container at the end of distillation therein, then returning said minor body to the container and thereafter withdrawing from the container another reserve of weak liquor and holding the same under a partial vacuum, and again proceeding with absorption in the container.

12. The improvement in the art of ammonia absorption refrigeration that consists in terminating absorption of expansate in the container, initiating distillation therein, distilling the strong liquor therein. meantime absorbing expansate in a small quantity of weak liquor in a suitable tank, terminating distillation and creating a substantial vacuum in the container, placing the tank and container in communication and thereby first discharging the contents of the tank into the container then refilling the tank with weak liquor from the container and meantime resuming the absorption of expansate in the container.

13. The improvement in the art of ammonia absorption refrigeration that consists in distilling the strong liquor in the container, meantime absorbing the expansate in weak liquor confined under vacuum in a closed tank, terminating distillation in the container, discharging the contents of the small tank into the container by the pressure created by expansate absorption, and then refilling the tank with weak liquor at the then pressure in the container.

14. The improvement in the art of ammonia absorption refrigeration that consists in terminating distillation in the container and forcibly creating a vacuum therein, forthwith directing expansate into the container, withdrawing a small body of liquor from the container and holding the same in reserve until the end of expansate absorption in the container, then cutting off the flow of expansate to the container and diverting the same into said small body, then distilling the strong liquor in the container, and thereafter again creating a vacuum in the container and permitting the return of said small body of liquor to the container when absorption of expansate is resumed in the container.

15. The improvement in the art of ammonia absorption refrigeration that consists in terminating the absorption of expansate in the container, then rapidly distilling the strong liquor in the container, then closing the container, then suddenly condensing the residue of vaporous distillate in the container and violently agitating the then weak liquor therein to absorb the residue of free ammonia gas in the container, thereby creating a substantial vacuum in the container and thereafter resuming the absorption of expansate in the container.

16. The improvement in the art of ammonia absorption refrigeration that consists in terminating distillation in the container, immediately cooling and condensing the major portion of the free vapors and gases in the container and thus lowering the pressure therein and causing the agitation or surging of the liquor in the container and thereby absorbing the residue of free gases, and producing a substantial vacuum over the hot liquor in the container.

17. The improvement in the art of ammonia absorption refrigeration that consists in terminating distillation in the container, immediately cooling and condensing the major portion of the free vapors and gases in the container and thus lowering the pressure therein and causing the agitation or surging of the liquor in the container and thereby absorbing the residue of free gases, and producing a substantial vacuum over the hot liquor in the container, and withdrawing from the container a reserve of weak liquor under vacuum.

18. The improvement in the art of ammonia absorption refrigeration that consists in terminating distillation in the container, immediately cooling and condensing the major portion of the free vapors and gas in the container and thus lowering the pressure therein and causing the agitation or surging of the liquor in the container and thereby absorbing the residue of free gas, and producing a substantial vacuum over the hot liquor in the container, and forthwith admitting expansate to the container.

19. The improvement in the art of ammonia absorption refrigeration that consists in confining strong liquor in upper and lower closed compartments which are in restricted communication, distilling the liquor therein until the upper compartment is substantially emptied of liquor, then cooling and condensing the vapors in the upper compartment and thus quickly reducing the pressure therein and thereby causing the liquor from the lower compartment to surge into the upper compartment and extract the residue of free gas therefrom thereby producing a substantial vacuum above the hot weak liquor and conditioning it to immediately absorb expansate.

20. The improvement in the art of ammonia absorption refrigeration that consists in distilling ammonia gas and water vapor from a body of strong liquor, condensing the same and holding the resultant liquid under pressure, placing the weak liquor of distillation under a substantial vacuum, permitting said liquid to expand and returning the expansate to said weak liquor.

21. The improvement in the art of ammonia absorption refrigeration that consists in distilling ammonia gas and water vapor from a body of strong liquor, condensing the same and holding the resultant liquid under pressure, placing the hot weak liquor of distillation under a substantial vacuum, permitting said liquid to expand and returning the expansate to said hot weak liquor.

22. The improvement in the art of ammonia absorption refrigeration that consists in distilling a major portion of ammonia gas and a minor portion of water vapor from a body of strong liquor, condensing the same and holding the resultant liquid under pressure, placing the weak liquor of distillation under a substantial vacuum, permitting said liquid to expand and returning the expansate to said weak liquor.

23. The improvement in the art of ammonia absorption refrigeration that consists in distilling a major portion of ammonia gas and a minor portion of water vapor from a body of strong liquor, condensing the same and holding the resultant liquid under pressure, placing the hot weak liquor of distillation under a substantial vacuum, permitting said liquid to expand and returning the expansate to said hot weak liquor.

24. The improvement in the art of ammonia absorption refrigeration that consists in confining a body of hot weak liquor under a substantial vacuum, then placing the refrigerating element in communication therewith, releasing into said element a solution of liquid ammonia and water, vaporizing the constituent water by force of the unresisted expansion of the solution, and condensing said vapor and absorbing the gas in the body of weak liquor.

25. The herein described improvement in the art of refrigeration that consists in rapidly distilling from a body of strong aqua ammonia confined in a suitable container substantially all of the ammonia gas and a quantity of water vapor, and concurrently condensing the gas and vapor in the form of a solution under pressure, then creating a vacuum over the hot weak liquor in the container, then admitting the expansate of said solution to the container, withdrawing from the container and confining under vacuum a quantity of weak liquor sufficient to receive expansate during the next distillation period, diverting the flow into the liquor thus reserved when the vacuum in the container is reduced by expansate absorption therein, then again distilling and condensing gas and water vapor from the contents of the container and establishing a vacuum in the container, restoring to the container the liquor previously withdrawn and then in a strong state, resuming absorption of expansate in the container and withdrawing another reserve of weak liquor from the container.

26. The herein described improvement in the art of refrigeration that consists in rapidly distilling from a body of strong aqua ammonia confined in a suitable container substantially all of the ammonia gas and a quantity of water vapor, and concurrently condensing the gas and vapor in the form of a solution under pressure, then terminating distillation and immediately condensing the vapor remaining in the container by cooling the same and agitating the weak liquor to remove the residual free gas in the container thus creating a vacuum over the hot weak liquor in the container, then admitting the expansate of said solution to the container, withdrawing from the container and confining under vacuum a quantity of weak liquor sufficient to receive expansate during the next distillation period, diverting the flow into the liquor thus reserved when the vacuum in the container is reduced by expansate absorption therein, then again distilling and condensing gas and water vapor from the contents of the container and establishing a vacuum in the container, restoring to the container the liquor previously withdrawn and then in a strong state, resuming absorption of expansate in the container and withdrawing another reserve of weak liquor from the container.

27. The herein described improvement in the art of refrigeration that consists in rapidly distilling from a body of strong aqua ammonia confined in a suitable container substantially all of the ammonia gas and a quantity of water vapor, and concurrently condensing the gas and vapor in the form of a solution under pressure, then creating a vacuum over the hot weak liquor in the container, admitting the expansate of said solution to the container, withdrawing from the container and confining under vacuum in an auxiliary tank a quantity of weak liquor sufficient to receive expansate during the next distillation period, diverting the flow into the liquor in the tank when the vacuum in the container is reduced by expansate absorption therein, then again distilling and condensing gas and water vapor from the contents of the container and establishing a vacuum in the container, permitting the liquor in the tank to return by its own pressure to the container, refilling the tank by equalizing the pressures in the same and the container, and resuming absorption of expansate in the container.

28. The herein described process of ammonia absorption, characterized by the sudden condensation of free vapor and absorption of free gas remaining in the top of the container after distillation, whereby the weak liquor is placed under vacuum, for the purpose described.

29. The herein described process of ammonia absorption refrigeration, characterized by the absorption of "wet" liquid ammonia expansate by weak liquor under less than atmospheric pressure.

30. The herein described process of ammonia absorption refrigeration, characterized by the absorption of "wet" liquid ammonia expansate by hot weak liquor under less than atmospheric pressure.

31. The herein described process of ammonia absorption refrigeration, characterized by the distillation of the strong liquor at rapidly increasing temperatures which result, in first driving off practically all ammonia and finally a quantity of water, to form "wet" liquid ammonia; and further characterized by the sudden condensation of free vapors and absorption of free gas, resulting in a vacuum upon the hot weak liquor, and which conditions the latter to immediately absorb expansate.

32. The herein described continuous process of ammonia absorption refrigeration, characterized by withdrawing a small quantity of weak liquor from the container and using the same to continue absorption of expansate after the liquor in the container has absorbed its quota of expansate and while it is being distilled, and thereafter restoring said small quantity of then strong liquor to the container.

33. The herein described continuous process of ammonia absorption refrigeration, characterized by placing both a large body of weak liquor and a small body of weak liquor under a substantial vacuum and thereafter admitting expansate to the large body and then, when the large body is to be distilled, admitting expansate to said small body, and finally admixing the small body with the large body after the latter has been distilled and is again ready to absorb expansate.

34. The improvement in the art of ammonia absorption refrigeration that consists in confining strong liquor in upper and lower closed compartments which are in restricted circulatory communication, distilling the liquor therein until the upper compartment is substantially emptied of liquor, then forcibly creating a vacuum over the hot liquor in the upper compartment, immediately thereafter admitting expansate to the lower compartment and cooling said upper compartment more rapidly than the lower whereby circulation between the compartments is augmented to insure the absorption of the expansate in said lower compartment.

35. The herein described process of conducting refrigeration in an ammonia absorption system that consists in distilling and condensing a major quantity of ammonia and a minor quantity of water from the container, holding the resultant solution under pressure, creating a vacuum in the return pipe of the system, admitting solution to the refrigerating coil and absorbing the expansate in the liquor in the container.

In testimony whereof, I have hereunto set my hand, this 2nd day of March 1914, in the presence of two subscribing witnesses.

WILLIAM J. KELLY.

Witnesses:
CHARLES GILBERT HAWLEY,
N. CURTIS LAMMOND.